United States Patent
Bai

(10) Patent No.: US 7,980,374 B2
(45) Date of Patent: Jul. 19, 2011

(54) FLOW ACCUMULATOR AND CLUTCH CONTROL SYSTEM FOR AUTOMATIC TRANSMISSIONS

(75) Inventor: Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 694 days.

(21) Appl. No.: 12/114,367

(22) Filed: May 2, 2008

(65) Prior Publication Data

US 2009/0275441 A1  Nov. 5, 2009

(51) Int. Cl.
*F16D 25/12* (2006.01)
(52) U.S. Cl. .............. 192/85.63; 192/109 F; 60/564
(58) Field of Classification Search ........... 192/85.63, 192/109 F; 60/563, 564
See application file for complete search history.

(56) References Cited

U.S. PATENT DOCUMENTS

| | | | | |
|---|---|---|---|---|
| 3,762,906 A | * | 10/1973 | Dahlman et al. | ........... 65/160 |
| 3,905,459 A | * | 9/1975 | Liebich | ........... 192/109 F |
| 5,301,783 A | * | 4/1994 | Malloy | ........... 192/85.63 |

* cited by examiner

*Primary Examiner* — Richard M. Lorence

(57) ABSTRACT

The present invention provides a flow accumulator and a clutch control system for an automatic transmission. The flow accumulator includes a dual area piston disposed in a complementary dual diameter cylinder. The small end of the piston is pressurized by fluid from a spool valve which supplies and exhausts fluid to the clutch. The large end of the piston displaces fluid into the clutch when the small end is pressurized. A flow restricting orifice is disposed in parallel with the flow accumulator between the spool valve and the clutch and a pair of check valves control fluid flow into and out of the larger diameter cylinder.

16 Claims, 2 Drawing Sheets

FLOW ACCUMULATOR AND CLUTCH CONTROL SYSTEM FOR AUTOMATIC TRANSMISSIONS

FIELD

Figure 1:
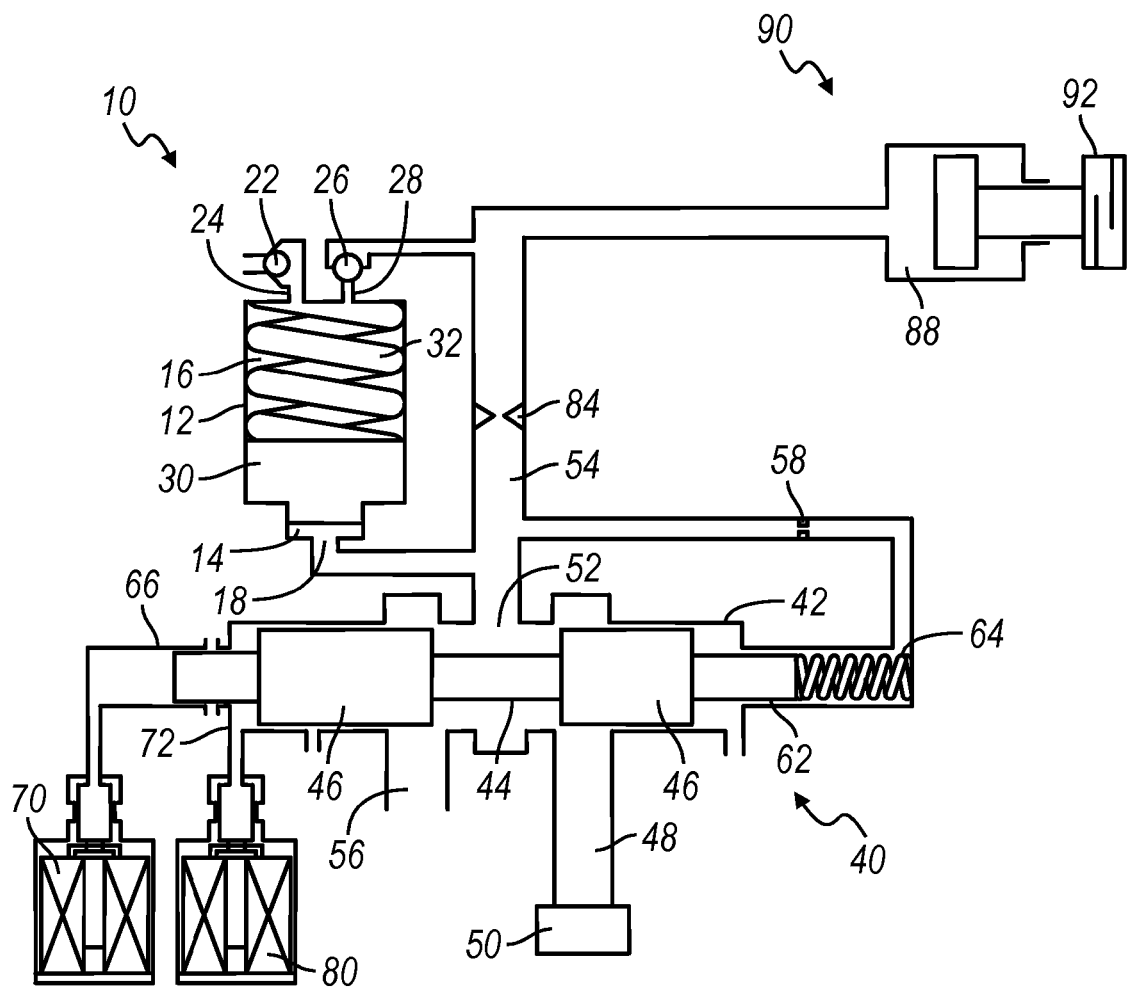

The present disclosure relates to a clutch control system for automatic transmissions and more particularly to an accumulator and clutch control system for automatic transmissions.

BACKGROUND

The statements in this section merely provide background information related to the present disclosure and may or may not constitute prior art.

In most modern automatic transmissions, hydraulic assemblies are filled and exhausted to engage and disengage various clutches and brakes to connect or release various gear components to selectively achieve a plurality of forward speeds or gear ratios and reverse.

One of the long recognized means of improving inter-ratio gear shifts, and one upon which there is much current emphasis, is to increase the speed of a shift, that is, to reduce the time between release of the currently engaged clutch(es) or brake (s) and engagement of the clutch(es) or brake(s) associated with the selected, new gear ratio.

One of the ways to increase shift speed is to increase fluid pressure and flow by increasing the size of the pump within the transmission. Any increase in pump size is accompanied by increased energy consumption and thus reduced overall efficiency of the transmission. Although important, compromising the efficiency of the transmission for shift events that occur during a small fraction of its operating time is not a readily acceptable tradeoff.

The present invention is directed to a device which provides improved shift speeds without the performance compromises accompanying prior solutions.

SUMMARY

The present invention provides a flow accumulator and a clutch control system for an automatic transmission. The flow accumulator includes a dual area piston disposed in a complementary dual diameter cylinder. The small end of the piston is pressurized by fluid from a spool valve which supplies and exhausts fluid to the clutch. The large end of the piston displaces fluid into the clutch when the small end is pressurized. A flow restricting orifice is disposed in parallel with the flow accumulator between the spool valve and the clutch and a pair of check valves control fluid flow into and out of the larger diameter cylinder. When the spool valve moves to provide hydraulic fluid to the clutch to engage it, fluid pressure on the small end of the piston displaces a larger volume of fluid by the large end of the piston to rapidly bring the clutch surfaces into engagement. As the fluid pressure continues to increase, the clutch surfaces engage and transmit torque. When the spool valve moves oppositely to release the clutch, fluid pressure in the clutch reduces and a first check valve inhibits reverse flow into the larger diameter cylinder while a second check valve allows fluid from an exhaust circuit to refill the larger cylinder. A flow accumulator according to the present invention increases clutch activation speed by increasing low pressure, i.e., initial, flow to a clutch and allows downsizing of the hydraulic pump or reduced energy consumption if this is a more desirable design goal.

Thus it is an object of the present invention to provide a flow accumulator for a clutch in an automatic transmission.

It is a further object of the present invention to provide a flow accumulator for an automatic transmission clutch utilized with a flow controlling spool valve.

It is a still further object of the present invention to provide a flow accumulator for an automatic transmission clutch disposed in parallel with a flow control orifice.

It is a still further object of the present invention to provide a flow accumulator for an automatic transmission clutch having a pair of check valves.

It is a still further object of the present invention to provide a flow accumulator for an automatic transmission clutch having a dual area piston.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a schematic diagram of a flow accumulator according to the present invention in a hydraulic clutch circuit of an automatic transmission, and FIGS. 2A, 2B, 2C and 2D are graphs illustrating various fluid pressures, piston displacement, fluid flows and force during operation of a fluid accumulator according to the present invention.

DETAILED DESCRIPTION

The following description is merely exemplary in nature and is not intended to limit the present disclosure, application, or uses.

With reference to FIG. 1, a flow accumulator according to the present invention in a hydraulic clutch circuit of an automatic transmission is illustrated and generally designated by the reference number 10. The flow accumulator 10 includes a stepped or dual diameter housing or cylinder 12 defining a first smaller diameter region 14 and a second larger diameter region 16. The first smaller diameter region 14 is accessible through a first inlet port 18. The second larger diameter region 16 is accessible through a first check valve 22 and an inlet or refill port 24. The first check valve 22 is configured to allow fluid flow from an exhaust feed line into the second larger diameter region 16 but not out of it. The second larger diameter region 16 is also accessible through a second check valve 26 and outlet or exhaust port 28. The second check valve 26 is configured to allow fluid flow out of the second larger diameter region 16 but not into it. The first and second check valves 22 and 26 may be any suitable type of one-way flow valves such as the ball type check valves illustrated, a flapper valve or a poppet valve. A stepped or dual diameter piston 30 is slidingly disposed within the stepped or dual diameter housing or cylinder 12 and a first compression spring 32 is disposed within the second larger diameter region 16 and biases the dual diameter piston 30 toward the first inlet port 18.

A spool valve 40 includes a generally cylindrical housing 42 which slidingly receives a valve spool 44. The valve spool 44 includes a plurality of spools or lands 46. The cylindrical housing 42 defines an inlet port 48, a supply port 52 which communicates with a branching supply line 54 and an exhaust port 56. The inlet port 48 is connected to a source of pressurized hydraulic fluid or oil such as a gear or gerotor pump 50 which may include a pressure regulator within the automatic transmission. One branch of the supply line 54 communicates with the first inlet port 18 of the flow accumulator 10. Another branch of the branching supply line communicates through a first flow restricting orifice 58 with a first control port 62 at one end of the housing 42 of the spool valve 40. A second compression spring 64 aligned with an end of the valve spool 44 biases the valve spool 44 away from the first control port 62.

A second control port 66 at the end of the cylindrical housing 42 opposite the first control port 62 receives pressurized hydraulic fluid from a first solenoid control valve 70 when it is energized and a third control port 72 adjacent the second control port 66 receives pressurized hydraulic fluid from a second solenoid control valve 80 when it is energized. Energization of the solenoid control valves 70 and 80 and supply of pressurized hydraulic fluid to the second and third control ports 66 and 72 controls or adjusts the axial position of the valve spool 44 and the lands 46 and thus whether pressurized hydraulic fluid is supplied from the inlet port 48 to the supply port 52 or whether hydraulic fluid in the supply port 52 and the branching supply line 54 is exhausted out the exhaust port 56.

In the branching supply line 54, in parallel with the flow accumulator 10 is a second flow restricting orifice 84. On the side of the second flow restricting orifice 84 opposite the spool valve 40, the second check valve 26 and outlet or exhaust port 28 communicate with the branching supply line 54. The branching supply line 54 terminates in a cylinder 88 of a piston and cylinder assembly 90 associated with a clutch or brake 92 of an automatic transmission (not illustrated). It will be appreciated that the automatic transmission may be, for example, a multiple planetary gear type, a dual clutch type or other configuration of automatic transmission and that the clutch or brake may be any type, for example, a plate or friction pack clutch or band or friction pack brake utilized in such a device.

The operation of the flow accumulator 10 will now be described. Energization of the second solenoid control valve 80 provides pressurized hydraulic fluid or oil to the valve spool 44 and translates it to the right in FIG. 1 to open the inlet port 48 and supply pressurized fluid to the outlet port 52 and the branching supply line 54. The orifices 58 and 84 provide controlled flow restrictions that create a pressure in this portion of the branching supply line 54 higher than on the downstream side of the orifices 58 and 64. The hydraulic pressure on the smaller face of the dual diameter piston 30 causes it to translate away from the inlet port 18. The first check valve 22 closes and the second check valve 26 opens to allow a relatively large volume of hydraulic fluid or oil to flow out of the second larger diameter region 16, into the branching supply line 54 and into the cylinder 88 of the piston and cylinder assembly 90. As the pressure in the branching supply line 54 continues to increase, the second check valve 26 will close, blocking flow into the second larger diameter region 16 of the dual diameter cylinder 12, maximum pressure will be applied to the clutch or brake 92 to fully engage it and pressure will build up at the first control port 62 and translate the valve spool 44 to the left to begin to close off the inlet port 48.

It should be appreciated that although the hydraulic fluid or oil initially filling the cylinder 88 is at a lower pressure than that nominally delivered by the pump 50 and that necessary to fully engage the clutch or brake 92, it is sufficient to translate the piston and clutch or brake 92 into incipient engagement, that is, to translate these components from an at rest, disengaged position to a position just short of full engagement after which there will be little additional movement but there will be significant increase in the pressure applied to the clutch or brake 92 to fully engage it. Accordingly, the flow accumulator 10 reduces the flow demand necessary to fill the cylinder 88 within an acceptable time. This benefit can be enjoyed either by utilizing the faster clutch fill and response time, by reducing the size and output flow of the hydraulic pump 50 or by a weighted compromise between these two operating parameters. It should also be appreciated that although the foregoing discussion has described engagement or activation of a clutch or brake 92 that in its relaxed or quiescent state is not transmitting torque, it is equally applicable to disengagement of such a device which is normally carrying torque and is activated to terminate the transmission of torque.

To release the clutch or brake 92, the solenoid valve 80 is de-energized and the fluid pressure at the first control port 62 and the force of the second compression spring 64 translates the valve spool 44 further to the left to close off the inlet port 48 and open the exhaust port 56. Fluid pressure in the branching supply line 54 drops, the first check valve 22 opens, the second check valve 26 remains closed, the first compression spring 32 translates the dual diameter piston 30 toward the inlet port 18 and the second larger diameter region 16 once again fills with fluid from the first inlet or refill port 24 which may be supplied with fluid from the exhaust port 56. The second larger diameter region 16 of the flow accumulator 10 according to the present invention is now filled with fluid and is ready to repeat the cycle when engagement of the clutch or brake 92 is commanded.

Figure 2A:
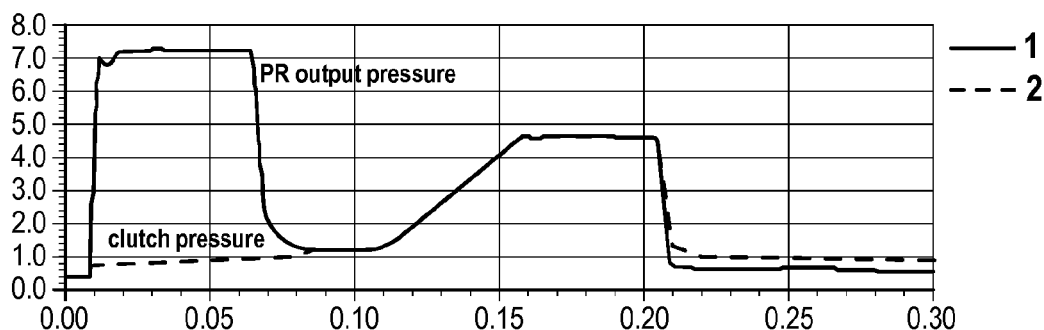
Figure 2B:
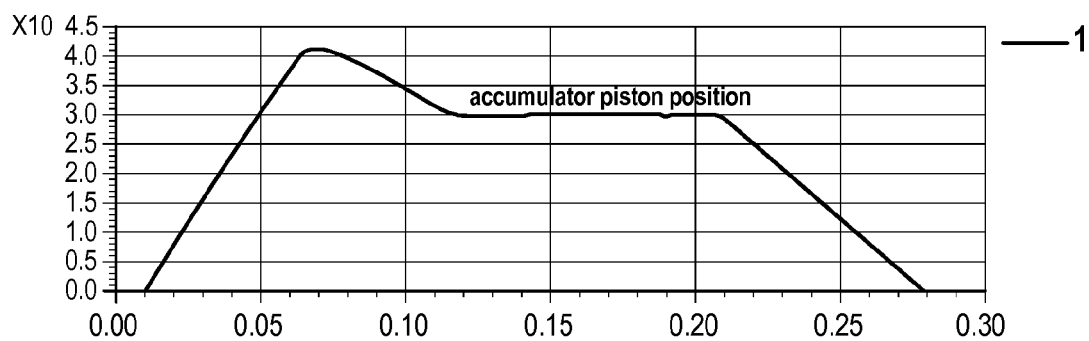
Figure 2C:
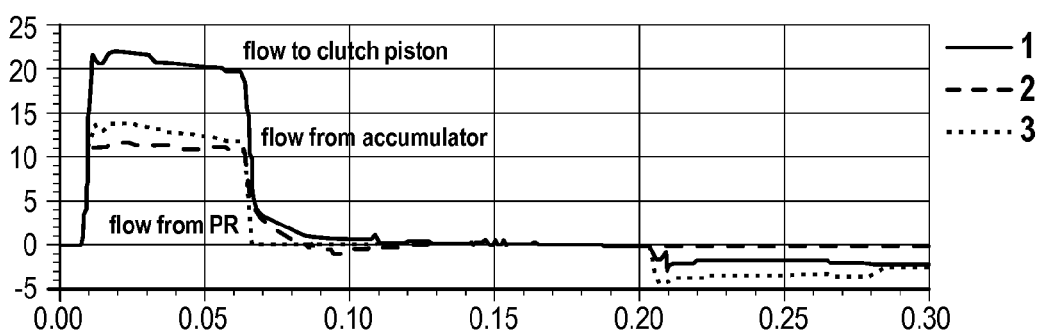
Figure 2D:
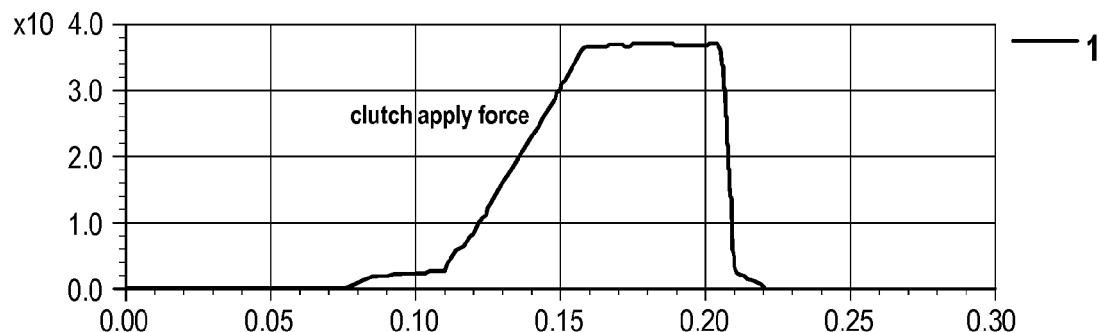

Referring now to the graphs of FIGS. 2A, 2B, 2C and 2D, they illustrate various relationships between hydraulic pressures and displacement during an operating cycle of the flow accumulator 10 described directly above. In FIG. 2A, as in all FIGS. 2B, 2C and 2D, the X axis (abscissa) is time. In FIG. 2A, the Y axis (ordinate) is relative pressure. The solid line represents pressure regulator output pressure and the dashed line represents the pressure in the piston and cylinder assembly 90. FIG. 2B, in synchronism with FIG. 2A, presents the displacement of the dual diameter piston 30. FIG. 2C, also in synchronism with FIG. 2A, presents flows: the solid line represents the total flow to the piston and cylinder assembly 90, the dashed line represents the flow from the accumulator 10 and the dotted line represents flow directly from the pressure regulator and the pump 50. FIG. 2D, also in synchronism with FIG. 2A, presents the force applied to the clutch or brake 92. Note that the pressure in the piston and cylinder assembly 90 and the force exerted by it on the clutch or brake 92 essentially begins to rise only after the flow of hydraulic fluid or oil (see FIG. 2C) has ceased. Thus, the significant fluid flow which is necessary to achieve incipient engagement of the clutch or brake 92 is at low pressure and is provided by the flow accumulator 10 of the present invention.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A control system for an automatic transmission comprising, in combination,
    a cylinder having a first smaller diameter region including an inlet port and a second larger diameter region,
    a dual diameter piston disposed in said cylinder
    a spring biasing said piston toward said smaller diameter region,
    a first check valve for allowing flow into said larger diameter region and a second check valve for allowing flow out of said larger diameter region, a piston and cylinder assembly adapted to operate a torque transmitting device, a control valve having an inlet port, a supply port and an exhaust port, said supply port communicating with said inlet port of said cylinder, said second check valve and said cylinder of said piston and cylinder assembly.

2. The control system of claim 1 further including a first flow restricting orifice disposed between said supply port and said second check valve and said cylinder of said piston and cylinder assembly.

3. The control system of claim 1 further including a second flow restricting orifice disposed between said supply port and a first control port of said control valve.

4. The control system of claim 1 wherein said torque transmitting device is a one of a clutch and a brake.

5. The control system of claim 1 wherein said control valve further includes a first control port at one end, a second control port at an opposite end, a valve spool and a spring for biasing said valve spool away from said first control port.

6. The control system of claim 1 wherein said control valve further includes a first control port at one end, a second control port at an opposite end and a solenoid valve for selectively providing pressurized fluid to said second control port.

7. The control system of claim 1 wherein said check valves include ball checks.

8. A control system for an automatic transmission comprising, in combination, a flow accumulator having a first smaller diameter region and a second larger diameter region communicating with a pair of check valves, one of said check valves allowing flow into said larger diameter region and another of said check valves allowing flow out of said larger diameter region, a dual diameter piston disposed in said cylinder, means for biasing said piston toward said smaller diameter region, a first flow restricting orifice disposed in a fluid path between said smaller diameter region of said flow accumulator and said another of said check valves, a control valve having an inlet port, a supply port and an exhaust port, said inlet port adapted to receive a flow of pressurized fluid, said supply port communicating with said smaller diameter region of said flow accumulator and said first flow restricting orifice.

9. The control system of claim 8 wherein said flow accumulator includes a housing defining a cylinder having a first smaller diameter and a second larger diameter.

10. The control system of claim 8 further including a piston and cylinder assembly in fluid communication with said another of said check valves.

11. The control system of claim 10 wherein said piston and cylinder assembly operates one of a clutch or brake.

12. The control system of claim 8 wherein said control valve further includes a first control port at one end, a second control port at an opposite end, a valve spool and a spring for biasing said valve spool away from said first control port.

13. The control system of claim 8 further including a second flow restricting orifice disposed between said supply port and a first control port of said control valve.

14. The control system of claim 8 wherein said pair of check valves include ball checks.

15. The control system of claim 8 further including at least one solenoid valve for selectively supplying pressurized fluid to a control port at an end of said control valve.

16. The control system of claim 8 wherein said means for biasing said piston is a compression spring.

\* \* \* \* \*